US008600237B2

(12) United States Patent
Green et al.

(10) Patent No.: US 8,600,237 B2
(45) Date of Patent: *Dec. 3, 2013

(54) BROADBAND RADIO TRANSCEIVER WITH OPTICAL TRANSFORM

(75) Inventors: Evan R. Green, Beaverton, OR (US); Mario J. Paniccia, Santa Clara, CA (US); Sean M. Koehl, Mountain View, CA (US); Richard Jones, San Mateo, CA (US); Guy S. Anthony, Hillsborough, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/976,099

(22) Filed: Dec. 22, 2010

(65) Prior Publication Data

US 2011/0091218 A1 Apr. 21, 2011

Related U.S. Application Data

(63) Continuation of application No. 10/749,184, filed on Dec. 30, 2003.

(51) Int. Cl.
*H04B 10/00* (2013.01)
(52) U.S. Cl.
USPC ............. 398/115; 398/140; 398/135; 398/79; 398/76; 398/116; 455/561; 455/562.1; 455/230; 455/450; 370/503; 370/537; 370/210; 370/536; 375/296; 375/260
(58) Field of Classification Search
USPC ......... 398/115, 116, 119, 128, 130, 135, 136, 398/138, 139, 183, 188, 186, 192, 193, 194, 398/202, 204, 212, 214, 140, 141, 127, 66, 398/68, 76, 79, 96, 103, 208, 158, 159; 455/561, 562.1, 230, 450, 522; 370/503, 351, 536, 537, 342, 210, 328, 370/442, 538; 375/296, 260, 316, 297, 295
See application file for complete search history.

(56) References Cited

U.S. PATENT DOCUMENTS 6,094,285 A * 7/2000 Wickham et al. ................. 398/1

(Continued)

FOREIGN PATENT DOCUMENTS

| WO | 2005/067183 A1 | 7/2005 |
|---|---|---|
| WO | WO-2005067183 | 7/2005 |

OTHER PUBLICATIONS

Batra, Anuj (Texas instruments) "Multi-band OFDM Physical Layer Proposal," Project: IEEE P802.15 Working Group for Wireless Personal Area Networks (WPANs), Doc. No. IEEE 802.15-03/267r6, Sep. 17, 2003, 51 pages.

(Continued)

*Primary Examiner* — Hanh Phan
(74) *Attorney, Agent, or Firm* — Blakely, Sokoloff, Taylor & Zafman LLP

(57) ABSTRACT

A broadband receiving apparatus includes an antenna to receive a radio signal having a plurality of modulation frequencies. An amplifier drives a laser source from the broadband radio signal to produce an optical signal having a plurality of spectral components. A diffraction grating transforms the optical signal into its spectral components. An array of photo-detectors converts the spectral components into electronic signals corresponding to the plurality of modulation frequencies. A transmitting apparatus includes an array of coherent laser emitters driven by electronic signals corresponding to a plurality of modulation frequencies to produce optical signals corresponding to a plurality of spectral components. A diffraction grating inverse transforms the spectral components into a composite optical signal. A photo-detector converts the composite optical signal into a composite electronic signal including the plurality of modulation frequencies. An amplifier amplifies the composite electronic signal for transmission as a broadband radio signal.

14 Claims, 7 Drawing Sheets

(56) References Cited

U.S. PATENT DOCUMENTS

| | | | |
|---|---|---|---|
| 6,137,612 | A | 10/2000 | Startup |
| 6,990,155 | B2 | 1/2006 | Adachi et al. |
| 7,043,271 | B1 | 5/2006 | Seto et al. |
| 7,085,497 | B2 * | 8/2006 | Tiemann et al. ............ 398/107 |
| 7,245,833 | B1 | 7/2007 | Volkening |
| 7,349,633 | B2 | 3/2008 | Lee et al. |
| 8,204,381 | B2 * | 6/2012 | Green et al. ............... 398/115 |
| 2002/0126338 | A1 | 9/2002 | Volpi et al. |
| 2002/0126349 | A1 * | 9/2002 | Sarraf ........................ 359/124 |
| 2003/0030865 | A1 * | 2/2003 | Yamada et al. ............ 359/124 |
| 2003/0147655 | A1 | 8/2003 | Shattil |
| 2003/0202794 | A1 | 10/2003 | Izadpanah et al. |
| 2005/0074037 | A1 * | 4/2005 | Rickard et al. ............. 370/537 |
| 2005/0113045 | A1 * | 5/2005 | Santhoff et al. ............ 455/130 |
| 2007/0286260 | A1 * | 12/2007 | Molisch et al. ............. 375/130 |
| 2011/0091218 | A1 | 4/2011 | Green et al. |

OTHER PUBLICATIONS

Batra et al. (Texas Instruments), "Multi-band OFDM Physical Layer Proposal for IEEE 802.15 Task Group 3a," Project: IEEE P802.15 Working Group for Wireless Personal Area Networks (WPANs), Doc. No. IEEE 802.15-031268r2, Nov. 10, 2003, 69 pages.

Aiello et al. (Staccato Communications), "Multi-band OFDM Physical Layer Proposal Update," Project: IEEE P802.15 Working Group for Wireless Personal Area Networks (WPANs), Doc. No. IEEE 802.15-03/449r2, Nov. 10, 2003.

Kusuma et al., "Sampling with Finite Rate of Innovation: Channel and Timing Estimation for UWB and GPS," 2003 IEEE International Conference on Communications, vol. 1, May 11, 2003, pp. 3540-3544.

International Search Report and Written Opinion received for PCT Patent Application No. PCT/US2004/043686, mailed on May 2, 2005, 12 pages.

Aiello, Robert G., Invited—Challenges for Ultra-Wideband (UWB) CMOS Integration, Discrete Time Communications, INc. San Diego, CA 92128, 2003 IEEE MTT-S Digest, Doc. No. 0-7803-7695-1/03, 2003 IEEE.

Graf et al., Fourier Gratings as THz Local Oscillator Multiplexer, Kosma, I. Physikalisches Institut, Universitet zu Koln, Zulpicher Str. 77, 50937 Koln, Germany, 1999.

Gandolfo et al. (Xtreme,Spectrum), 802.15.3 Overview/Update, WiMedia Presentation, Oct. 2002, 23 pages.

International Preliminary Report on Patentability received for PCT Patent Application No. PCT/US2004/043686, mailed on Jul. 13, 2006, 7 pages.

Office Action for U.S. Appl. No. 10/749,184 mailed Jul. 12, 2011, 13 pgs.

\* cited by examiner

BROADBAND RADIO TRANSCEIVER WITH OPTICAL TRANSFORM

FIELD OF THE DISCLOSURE

This disclosure relates generally to the fields of wireless communications and silicon photonics. In particular, the disclosure relates to use of an optical transform to perform efficient modulation in ultra wideband radio systems.

BACKGROUND OF THE DISCLOSURE

Ultra wideband (UWB) radio systems provide large bandwidths. Deployment of UWB systems at low power levels is permitted within the 3.1-10.6 GHz spectrum (typically expected at 6 GHz or more).

State of the art modulations schemes such as orthogonal frequency domain multiplexing (OFDM) can maintain orthogonality while splitting wide spectrum signals into sub-bands or combining sub-bands into wide spectrum signals. Currently, only bandwidths of less than 100 MHz have been able to exploit OFDM due to its large processing requirements. Even the high end digital samplers at 1-2 GHz, are still 6 times slower today than what may be needed. Unfortunately the digital signal processing power and sampling rates required by such state of the art modulation schemes may be prohibitive for UWB bandwidths in electronic circuitry anytime in the near future.

BRIEF DESCRIPTION OF THE DRAWINGS

The present invention is illustrated by way of example and not limitation in the figures of the accompanying drawings.

DETAILED DESCRIPTION

Disclosed herein are processes and apparatus for an ultra wideband transceiver with optical transforms. One embodiment of a receiving apparatus includes an antenna to receive an ultra wideband radio signal having a plurality of modulation frequencies. A low noise amplifier is coupled with the antenna to drive a laser source from the ultra wideband radio signal to produce an optical signal having a plurality of spectral components. A diffraction grating transforms the optical signal into its spectral components. An array of photo-detectors converts the spectral components into electronic signals corresponding to the plurality of modulation frequencies.

An embodiment of a transmitting apparatus includes an array of laser emitters driven by electronic signals corresponding to a plurality of channel modulation frequencies to produce optical signals corresponding to a plurality of spectral components. A diffraction grating inverse-transforms the spectral components into a composite optical signal. A photo-detector converts the composite optical signal into a composite electronic signal including the plurality of modulation frequencies. An amplifier amplifies the composite electronic signal for transmission as an ultra wideband radio signal.

These and other embodiments of the present invention may be realized in accordance with the following teachings and it should be evident that various modifications and changes may be made in the following teachings without departing from the broader spirit and scope of the invention. It will be appreciated that while examples presented below illustrate using optical transforms for orthogonal frequency domain multiplexing (OFDM) in an ultra wideband (IEEE Std. 802.15.3a will be available from standards.ieee.org/getieee802) transceiver, the techniques disclosed are more broadly applicable. For example, systems using the IEEE's 802.11a (available from standards.ieee.org/getieee802) in the United States, titled "High Speed Physical Layer in the 5 GHz band," or systems using the European Telecommunications Standards Institute's HiperLAN/2 (available from portal.etsi.org/bran/kta/Hiperlan/hiperlan2.asp), which stands for "High Performance Radio Local Area. Network," may also make advantageous use of such techniques. The specification and drawings are, accordingly, to be regarded in an illustrative rather than restrictive sense and the invention measured only in terms of the accompanying claims.

Figure 1:
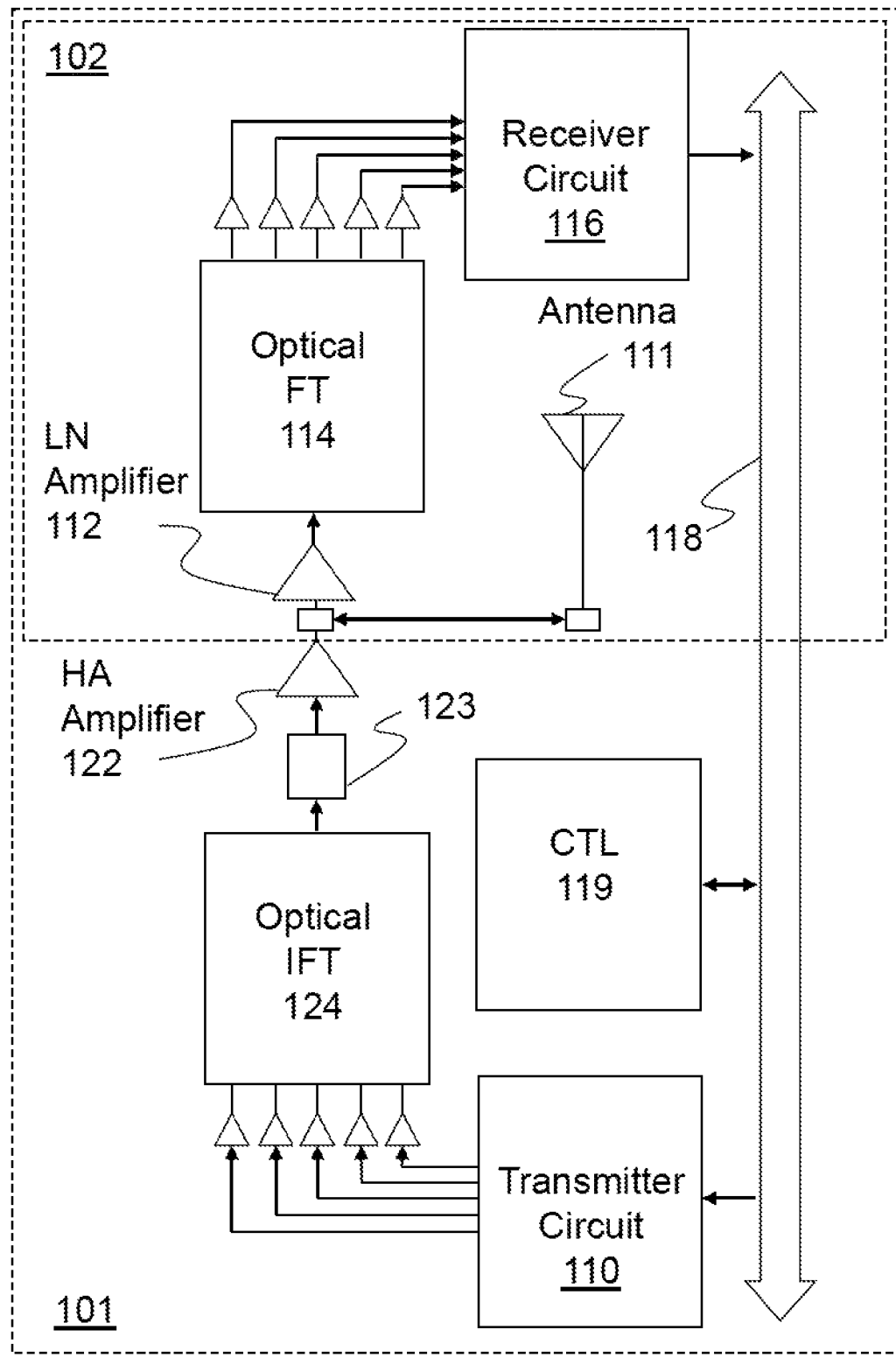
FIG. 1 illustrates one embodiment of an ultra wideband transceiver radio system with optical transforms.

FIG. 1 illustrates one embodiment of an ultra wideband transceiver radio system 101 with optical transforms 114 and 124. In receiver radio 102, an antenna 111 may receive a first ultra wideband radio signal having a plurality of modulation frequencies. A low noise amplifier 112 coupled with the antenna 111 drives a laser source of optical transform 114 from the first ultra wideband radio signal to produce an optical signal.

Optical transform 114 separates the first optical signal into its spectral components, substantially performing the function of a Fourier transform. Photo-detectors convert the separate spectral components into a plurality of electronic signals that correspond to the plurality of modulation frequencies and transmit the plurality of electronic signals to receiver circuitry 116. Receiver circuit 116 may perform well known operations of OFDM, such as demapping, deinterleaving, and forward-error-correction (FEC) decoding.

Receiver circuit 116 is coupled with transmitter circuit 110 and control circuit 119 via bus 118. Transmitter circuit 110 may perform well known operations of OFDM such as FEC convolutional encoding, interleaving and mapping. A second plurality of electronic signals corresponding to the plurality of modulation frequencies drive laser emitters to produce a plurality of optical signals of corresponding spectral components. Optical inverse transform 124 consolidates the plurality of optical signals into a second optical signal including their corresponding spectral components, substantially performing the function of an inverse-Fourier transform. A photo-detector converts the second optical signal into a composite electronic signal including the plurality of modulation frequencies and transmits the composite electronic signal to processing block 123. Processing block 123 may perform well known operations of OFDM, such as guard interval (GI) addition, symbol wave shaping and interphase/quadrature (IQ) modulation. A high power amplifier 122 coupled with antenna 111, amplifies the composite electronic signal including the plurality of modulation frequencies for transmission by antenna 111 as a second ultra wideband radio signal.

It will be appreciated that a UWB transceiver radio system using optical transforms 114 and 124 may provide for optical processing of GHz wide spectrum, which may not be possible anytime in the near future for electronic processing techniques. For example, state-of-the-art electronic samplers currently digitize samples at rates of 1-1.5 GHz, but to meet the Nyquist criteria for 6 GHz of bandwidth would require at least a 12 GHz sampler. Therefore, even if such samplers were available, optical processing may provide for solutions at reduced cost and reduced power consumption. It will also be appreciated that transceiver radio systems may also benefit from an optical transform only in the receiver or in the transmitter, rather than both.

Figure 2A:
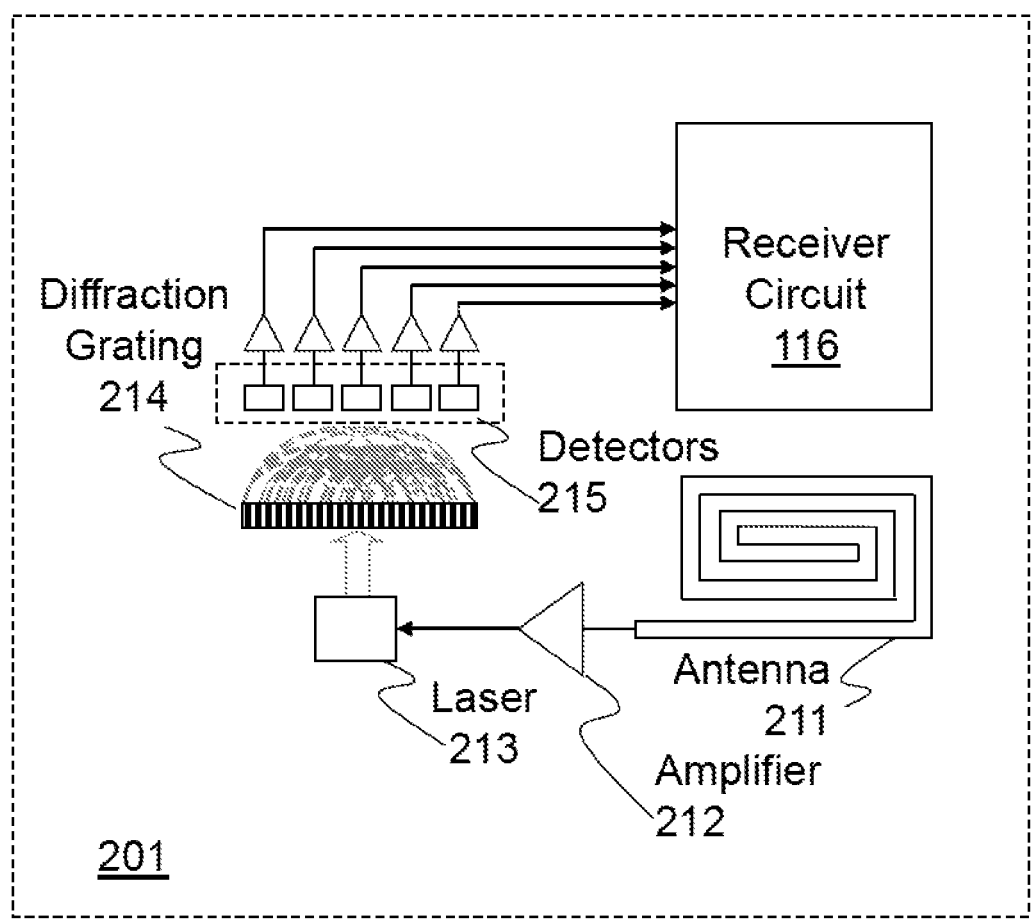
FIGS. 2a-2b illustrate embodiments of ultra wideband radio receiver apparatus with optical transforms.

FIG. 2a illustrate one embodiment of ultra wideband radio receiver apparatus 201 with an optical transform. Antenna 211 may receive an ultra wideband radio signal having a plurality of modulation frequencies. Low noise amplifier 212 is coupled with antenna 211 to drive a laser source 213 from the ultra wideband radio signal to produce an optical signal having a plurality of spectral components. Laser source 213 may be an edge emitting laser, such as a Fabry-Perot laser for example, or may be a vertical cavity surface-emitting (VCSEL) laser. Diffraction grating 214 transforms the optical signal into its spectral components. Transforming the optical signal is accomplished by transmitting the optical signal through diffraction grating 214. A plurality of photo-detectors 215 convert the optical spectral components into electronic signals corresponding to the plurality of modulation frequencies and transmits the electronic signals to receiver circuitry 116. As in FIG. 1, receiver circuit 116 may perform well known operations of OFDM, such as demapping, deinterleaving, and FEC decoding.

Figure 2B:
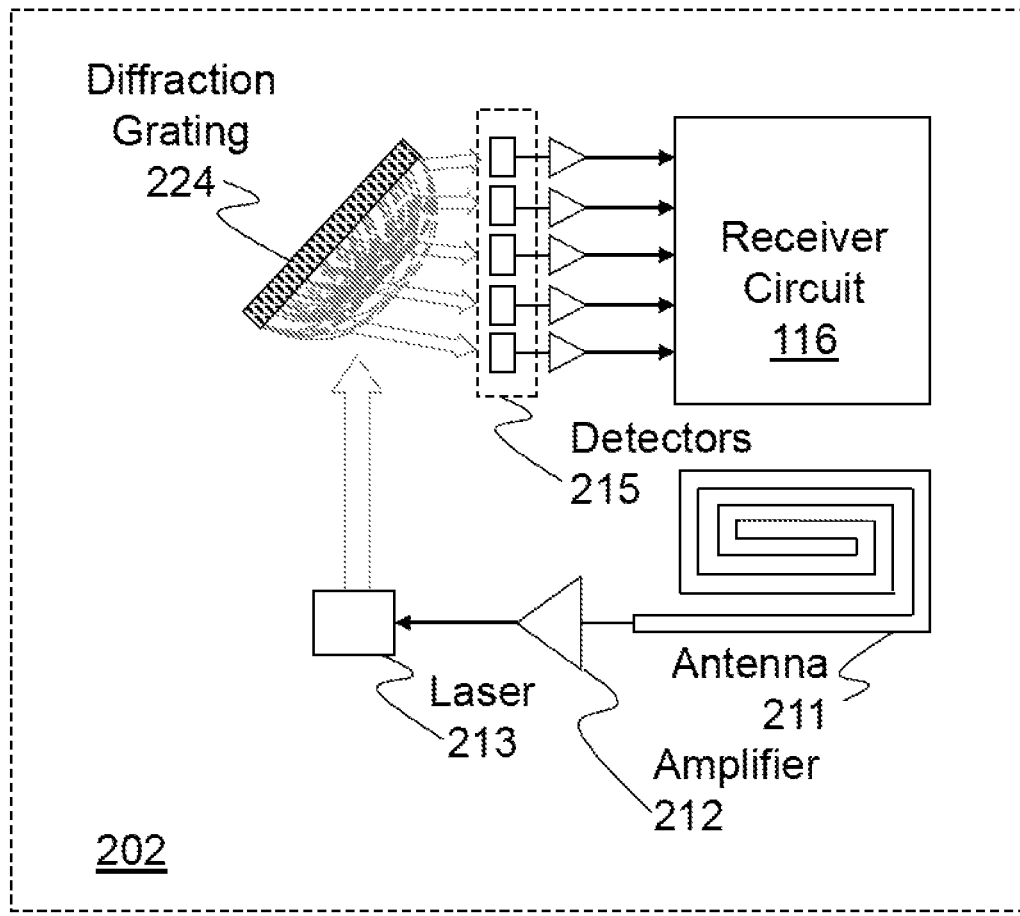

FIG. 2b illustrate an alternative embodiment of ultra wideband radio receiver apparatus 202 with an optical transform. In similarity to FIG. 2a, antenna 211 may receive an ultra wideband radio signal having a plurality of modulation frequencies and amplifier 212 drives laser source 213 from the ultra wideband radio signal to produce an optical signal having a plurality of spectral components. Diffraction grating 224 transforms the optical signal into its spectral components. In this case, transforming the optical signal is accomplished by reflecting the optical signal with diffraction grating 224. Photo-detectors 215 convert the optical spectral components into electronic signals corresponding to the plurality of modulation frequencies and transmits the electronic signals to receiver circuitry 116.

Figure 3A:
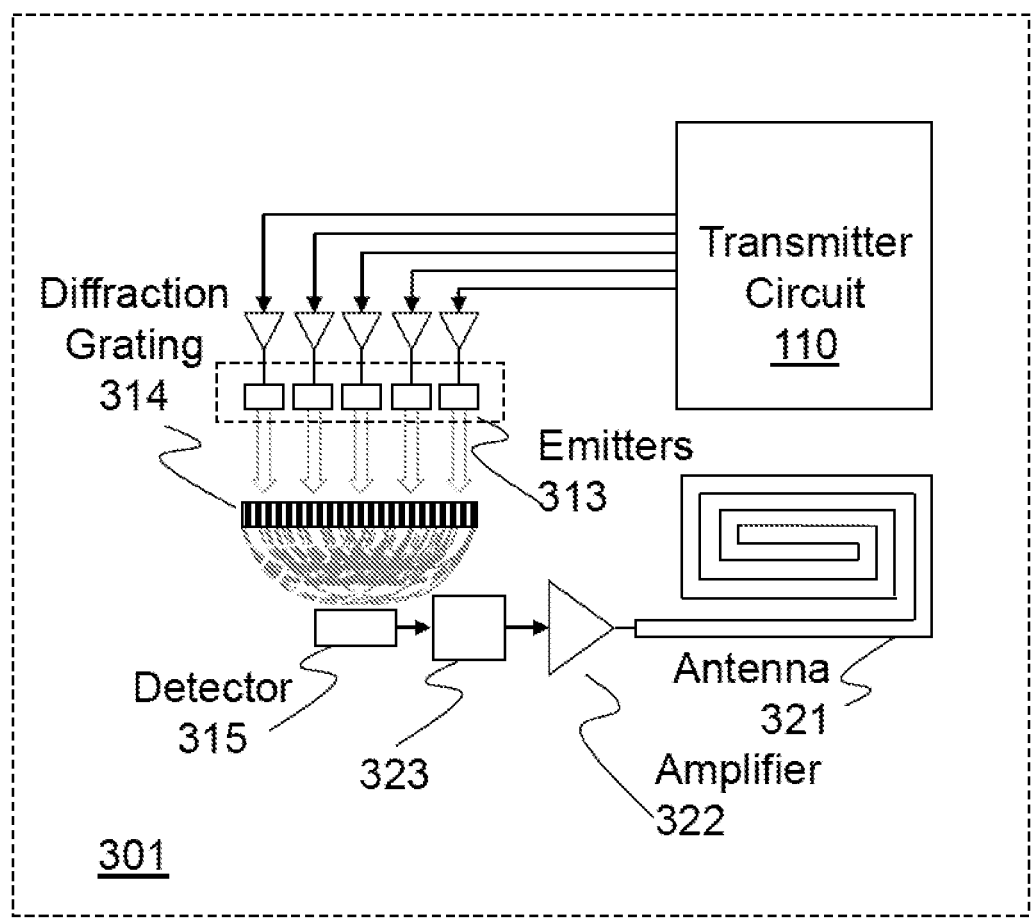
FIGS. 3a-3b illustrate embodiments of ultra wideband radio transmitter apparatus with optical inverse transforms.

FIG. 3a illustrates one embodiment of an ultra wideband radio transmitter apparatus 301 with an optical inverse transform. A plurality of laser emitters 313 are driven by electronic signals corresponding to a plurality of modulation frequencies to produce optical signals corresponding to a plurality of spectral components. The plurality of laser emitters 313 may comprise edge emitting lasers and/or VCSEL lasers. For one embodiment, emitters 313 comprise a coherent array of emitters, for example, being generated from a single laser source and independently modulated with electro-absorption modulators or lithium-niobate modulators. Diffraction grating 314 inverse transforms the optical signals into a composite optical signal including the plurality of spectral components. Inverse-transform of the optical signals is accomplished by transmitting the optical signals through diffraction grating 314. Photo-detector 315 converts the composite optical signal including the plurality of spectral components into a composite electronic signal including the plurality of modulation frequencies and transmits the composite electronic signal to processing block 323. As above, processing block 323 may perform well known operations of OFDM, such as GI addition, symbol wave shaping and IQ modulation. A high power amplifier 322 is coupled with an antenna 321 to amplify the composite electronic signal including the plurality of modulation frequencies for transmission by antenna 321 as an ultra wideband radio signal.

Figure 3B:
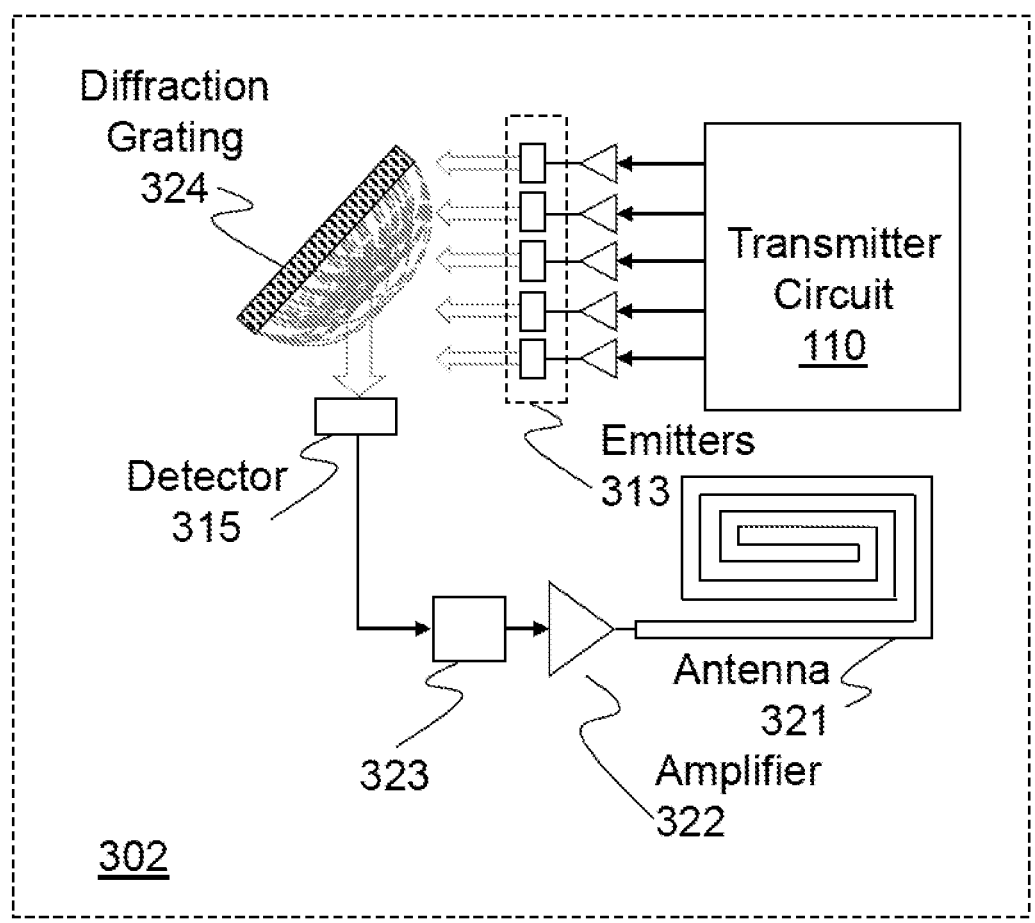

FIG. 3b illustrates an alternative embodiment of an ultra wideband radio transmitter apparatus 302 with an optical inverse transform. In similarity to FIG. 3a, laser emitters 313 are driven by electronic signals corresponding to a plurality of modulation frequencies to produce optical signals. Diffraction grating 324 inverse transforms the optical signals into a composite optical signal. Inverse transform of the optical signals is accomplished by reflecting the plurality of optical signals with the diffraction grating 324. Photo-detector 315 converts the composite optical signal into a composite electronic signal including the plurality of modulation frequencies and transmits the composite electronic signal to processing block 323, which transmits to high power amplifier 322 to amplify the composite electronic signal for transmission by antenna 321 as an ultra wideband radio signal.

It will be appreciated that through the use of optical based Fourier transforms and inverse-Fourier transforms, reductions may be made in the speed and power requirements of the electronic processing components while still providing for very high UWB system performance.

Figure 4:
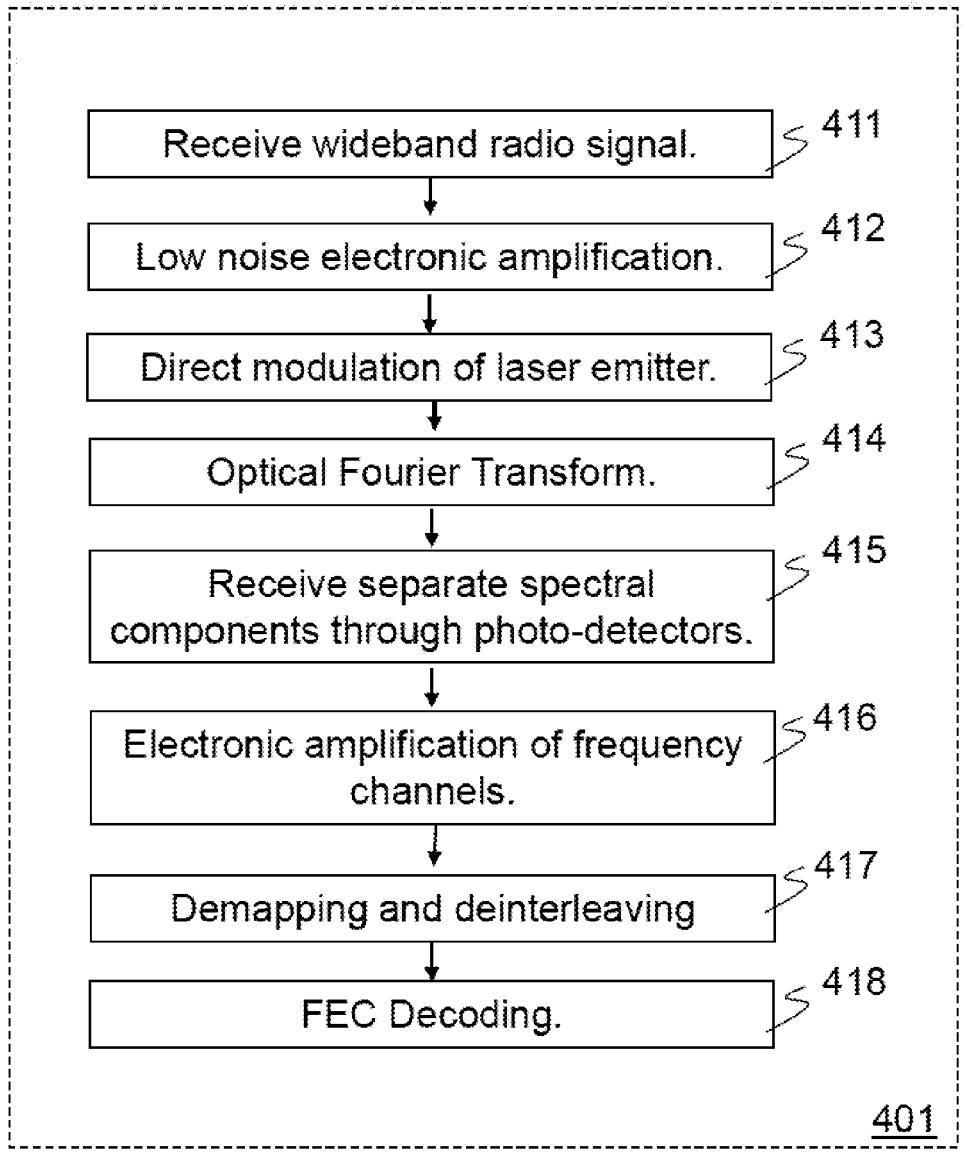
FIG. 4 illustrates a flow diagram of one embodiment of a process for orthogonal frequency domain multiplexing (OFDM) with optical transforms in an ultra wideband receiver.

FIG. 4 illustrates a flow diagram of one embodiment of a process for OFDM with optical transforms in an ultra wideband receiver. Process 401 and other processes herein disclosed are performed by processing blocks that may comprise dedicated electronic or photonic hardware or software or firmware operation codes executable by general purpose machines or by special purpose machines or by a combination of both. It will be appreciated that while process 401 and other processes herein disclosed are illustrated, for the purpose of clarity, as processing blocks with a particular sequence, some operations of these processing blocks may also be conveniently performed in parallel or their sequence may be conveniently permuted so that the some operations are performed in different orders, or some operations may be conveniently performed out of order.

In processing block 411, a wideband radio signal having a plurality of modulation frequencies is received, for example a UWB signal. Processing proceeds in processing block 412 where the ultra wideband radio signal is electronically amplified, for example through a low noise amplifier 112, to directly modulate a laser emitter in processing block 413 to produce an optical signal having a plurality of spectral components. In processing block 414, an optical Fourier transform is performed on the optical signal. Processing continues in processing block 415 where the separate spectral components are received and converted by corresponding photo-detectors into electronic signals corresponding to modulation frequency channels.

It will be appreciated that while examples herein presented illustrate the use of optical Fourier transforms for OFDM, for example in a UWB transceiver (IEEE Std. 802.15.3a, not currently available), or for example in a system using IEEE Std. 802.11a (available from standards.ieee.org/getieee802); it is not necessary that any particular OFDM standard be used, and therefore processing blocks which may perform processing specific to OFDM may be considered optional. In processing block 416 the electronic signals are amplified and processing optionally proceeds to processing block 417 where OFDM demapping and deinterleaving occurs. Finally in processing block 418 optional forward-error-correction (FEC) decoding occurs.

Figure 5:
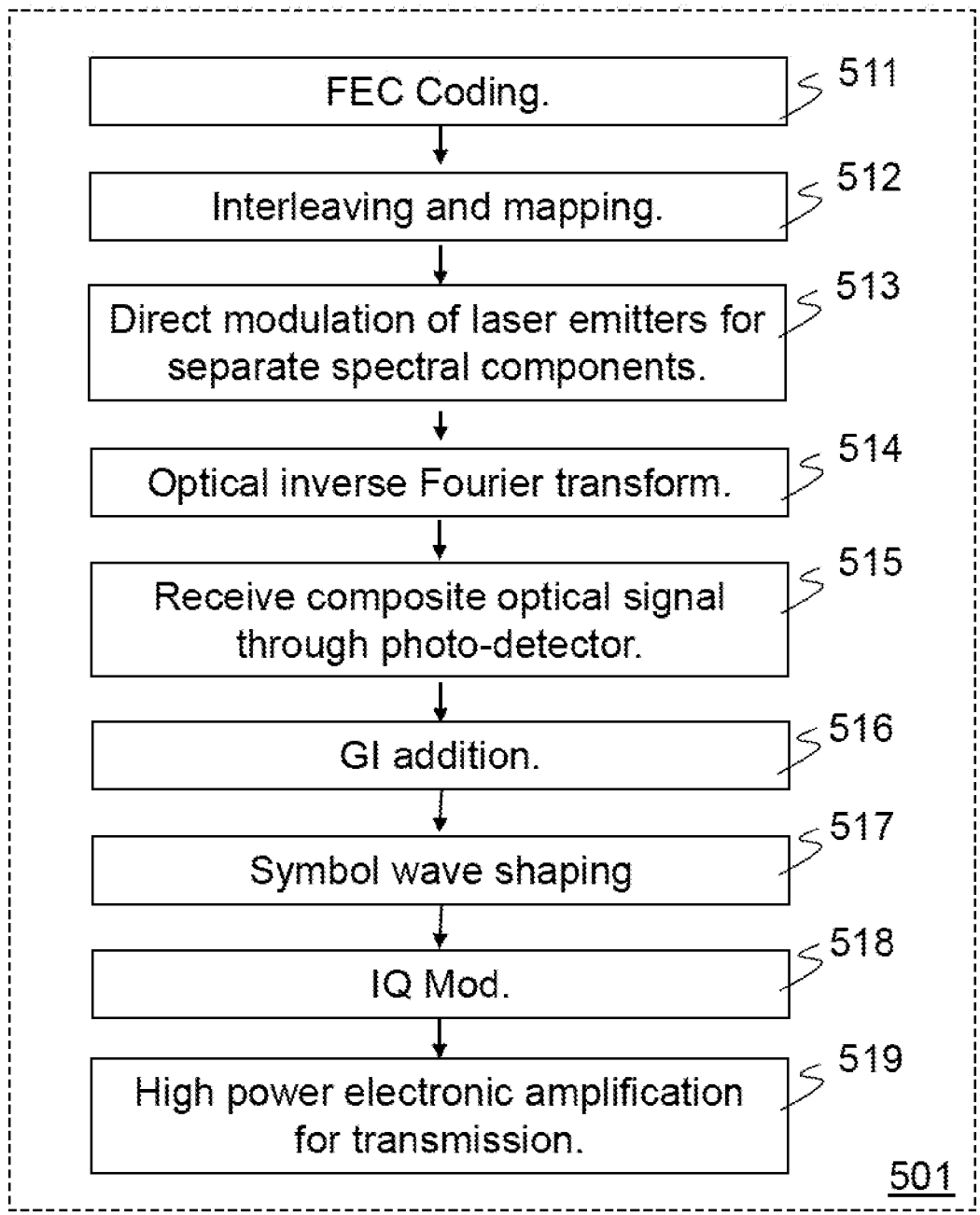
FIG. 5 illustrates a flow diagram of one embodiment of a process for OFDM with optical transforms in an ultra wideband transmitter.

FIG. 5 illustrates a flow diagram of one embodiment of a process for OFDM with optical inverse-Fourier transforms in an ultra wideband transmitter. In processing block 511, optional FEC convolutional encoding occurs. Processing then optionally proceeds to processing block 512 where OFDM interleaving and mapping occurs. Processing then proceeds to processing block 513 where a plurality of laser emitters are directly modulated by electronic signals corresponding to a plurality of modulation frequencies to produce optical signals corresponding to a plurality of spectral components. In processing block 514 an optical inverse-Fourier transform is performed on the optical signals to produce a composite optical signal including the plurality of spectral components. In processing block 515, a photo-detector receives and converts the composite optical signal including the plurality of spectral components into a composite electronic signal including the plurality of modulation frequencies. Processing optionally proceeds in processing blocks 516-518 where OFDM processing: guard interval (GI) addition, symbol wave shaping and interphase/quadrature (IQ) modulation occurs. Processing then proceed to processing block 519 where the composite electronic signal including the plurality of modulation frequencies is amplified for transmission, for example as a UWB radio signal.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims.

What is claimed is:

1. A device, comprising:
   an optical divider to
      receive an optical signal at an optical input, the optical input configurable to receive a fiber optic input cable entering the optical divider; and
      split the received optical signal into a plurality of optical output signals,
   each optical output signal exiting the optical divider on a separate optical output; and
   an array of photodiodes configurable to
      receive the plurality of optical output signals;
      convert the plurality of received optical output signals into a plurality of an orthogonal frequency domain multiplexing (OFDM) electrical signals in an ultra wide band (UWB), wherein the UWB comprises at least a one-GHz wide spectrum; and
      send the plurality of electrical signals over a plurality of electrical transmission lines.

2. The device of claim 1, wherein the separate optical outputs are each to receive at least one corresponding fiber optic output cable exiting the optical divider.

3. The device of claim 2, wherein each fiber optic output cable is aligned to focus on a single photodiode within the array of photodiodes.

4. The device of claim 1, wherein the optical signal received at the optical input is derived from a radio signal in a radio over fiber system.

5. The device of claim 1, further comprising:
   amplification circuitry to amplify the plurality electrical signals.

6. The device of claim 5, wherein the plurality of electrical signals are combined into a composite electrical signal.

7. The device of claim 6, further comprising:
   radio transmission circuitry to transmit the composite electrical signal as a radio signal.

8. The device of claim 1 wherein the UWB signal conforms to an IEEE 802.15 standard.

9. A method, comprising:
   receiving an optical signal at an optical input, the optical input configurable to receive a fiber optic input cable entering an optical divider; and
   splitting the received optical signal into a plurality of optical output signals, each optical output signal exiting the optical divider on a separate optical output; and
   receiving the plurality of optical output signals at an array of photodiodes;
   converting the plurality of received optical output signals into a plurality of an orthogonal frequency domain multiplexing (OFDM) electrical signals in an ultra wide band (UWB), wherein the UWB comprises at least a one-GHz wide spectrum; and
   sending the plurality of electrical signals over a plurality of electrical transmission lines.

10. The method of claim 9, further comprising:
    deriving the optical signal received at the optical input from a radio signal in a radio over fiber system.

11. The method of claim 9, further comprising:
    amplifying the plurality electrical signals.

12. The method of claim 11, further comprising:
    combining the plurality of electrical signals into a composite electrical signal.

13. The method of claim 12, further comprising:
    transmitting transmit the composite electrical signal as a radio signal.

14. The method of claim 9 wherein the UWB signal conforms to an IEEE 802.15 standard.

* * * * *